US011605396B2

(12) United States Patent
Brown

(10) Patent No.: US 11,605,396 B2
(45) Date of Patent: Mar. 14, 2023

(54) IMAGE PROCESSING SYSTEM AND METHOD

(71) Applicant: Sony Interactive Entertainment Inc., Tokyo (JP)

(72) Inventor: Neil Jonathan Brown, Godmanchester (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/466,145

(22) PCT Filed: Dec. 6, 2017

(86) PCT No.: PCT/GB2017/053675
§ 371 (c)(1),
(2) Date: Jun. 3, 2019

(87) PCT Pub. No.: WO2018/104731
PCT Pub. Date: Jun. 14, 2018

(65) Prior Publication Data
US 2020/0082842 A1    Mar. 12, 2020

(30) Foreign Application Priority Data
Dec. 9, 2016    (GB) ...................................... 1620986

(51) Int. Cl.
G10L 21/10    (2013.01)
G06T 11/00    (2006.01)
(Continued)

(52) U.S. Cl.
CPC .............. *G10L 21/10* (2013.01); *G06T 11/00* (2013.01); *G10L 25/51* (2013.01); *H04R 1/08* (2013.01)

(58) Field of Classification Search
None
See application file for complete search history.

(56) References Cited

U.S. PATENT DOCUMENTS 8,183,997 B1    5/2012    Wong
10,353,198 B2    7/2019    Sakai
(Continued)

FOREIGN PATENT DOCUMENTS

CN    102543099 A    7/2012
EP    2469323 A1    6/2012
(Continued)

OTHER PUBLICATIONS

International Search Report and Written Opinion for corresponding PCT Application No. PCT/GB2017/053675, 12 pages, dated Mar. 12, 2018.
(Continued)

*Primary Examiner* — Peter Hoang
(74) *Attorney, Agent, or Firm* — Matthew B. Dernier, Esq.

(57) ABSTRACT

An image processing system for generating an image for display to a user at a head-mountable display device includes: a sound input unit configured to receive sound information relating to one or more sounds, an audio processing unit configured to analyse the sound information relating to the one or more sounds, an image generation unit configured to generate one or more image elements that indicate properties of analysed sound information, and an image output unit configured to output display images for display to a user of a head-mountable display device, the images comprising the generated image elements as an image overlay, where the one or more generated image elements are indicative of the direction of the source of the one or more sounds.

12 Claims, 7 Drawing Sheets

(51) Int. Cl.
*G10L 25/51* (2013.01)
*H04R 1/08* (2006.01)

(56) References Cited

U.S. PATENT DOCUMENTS

| | | | |
|---|---|---|---|
| 2012/0162259 A1 | 6/2012 | Sakai | |
| 2013/0142347 A1 | 6/2013 | Lord | |
| 2014/0307879 A1 | 10/2014 | Wang | |
| 2016/0088417 A1* | 3/2016 | Kim | H04S 1/005 |
| | | | 381/17 |
| 2017/0038837 A1* | 2/2017 | Faaborg | G06F 3/011 |
| 2018/0034867 A1* | 2/2018 | Zahn | H04L 51/046 |
| 2018/0139565 A1* | 5/2018 | Norris | H04S 1/007 |

FOREIGN PATENT DOCUMENTS

| | | |
|---|---|---|
| JP | 2008065675 A | 3/2008 |
| JP | 2010145878 A | 7/2010 |
| KR | 1020170025231 A | 3/2017 |
| WO | 2006078401 A1 | 7/2006 |
| WO | 2014113891 A1 | 7/2014 |

OTHER PUBLICATIONS

Combined Search and Examination Report for corresponding GB Application No. 1620986.8, 3 pages, dated May 29, 2017.
First Office Action for corresponding CN Application No. 201780076285.9, 8 pages, dated Oct. 14, 2022.

\* cited by examiner

LEFT   RIGHT

IMAGE PROCESSING SYSTEM AND METHOD

BACKGROUND

This invention relates to an image processing system and method. In a head-mountable display (HMD), an image or video display device is provided which may be worn on the head or as part of a helmet. Either one eye or both eyes are provided with small electronic display devices.

SUMMARY

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner— for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications. In such arrangements it may be preferable to provide headphones as a source of sound, in addition to mitigating the impact of external sounds on the level of immersion experienced by the user of the HMD when viewing content.

However, by providing an arrangement in which external sounds may be difficult for a user to notice or simply not heard by a user (or in a case in which the user is hard of hearing) problems may be encountered; for example, a doorbell may not be heard or an approaching vehicle may not be detected if the HMD is used outside and the vehicle is not within the field of view of the user.

Various aspects and features of the present invention are defined in the appended claims and within the text of the accompanying description and include at least a head mountable apparatus such as a display and a method of operating a head-mountable apparatus as well as a computer program.

BRIEF DESCRIPTION OF THE DRAWINGS

Embodiments of the disclosure will now be described with reference to the accompanying drawings, in which.

DETAILED DESCRIPTION

Embodiments of the present disclosure can provide an arrangement in which sounds that may not be heard by a user are represented visually. Such an arrangement is operable to receive sound information and analyse the sound information to detect a direction of the source of a sound. An image element is then generated and displayed that is indicative of at least the direction of the sound source relative to the HMD user. Embodiments of the present disclosure may therefore mitigate the problem of users being unable to clearly identify external sounds when using an HMD by communicating them visually.

Figure 1:
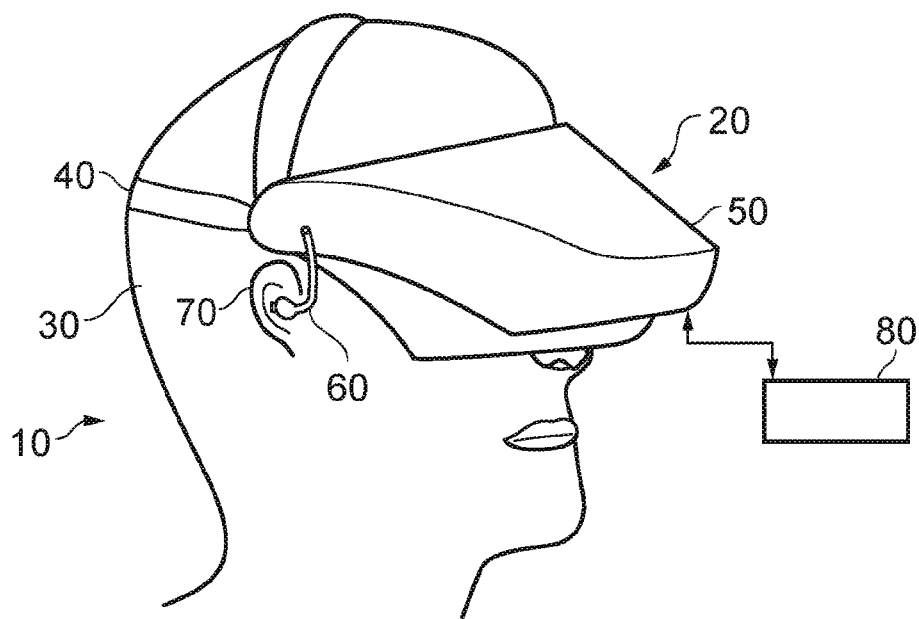
FIG. 1 schematically illustrates an HMD worn by a user.

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes. The HMD also comprises a microphone 90, which in some embodiments may be a directional microphone or a microphone array for detecting the direction of the source of a captured sound.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

Figure 2:
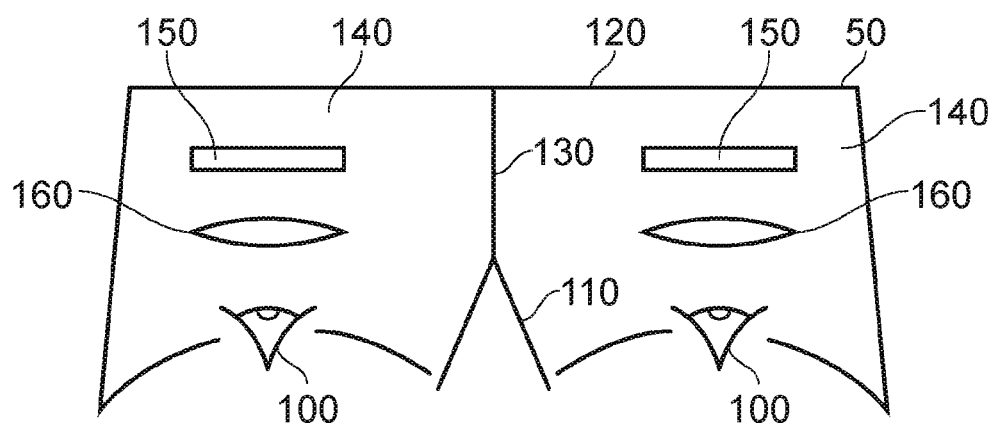
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
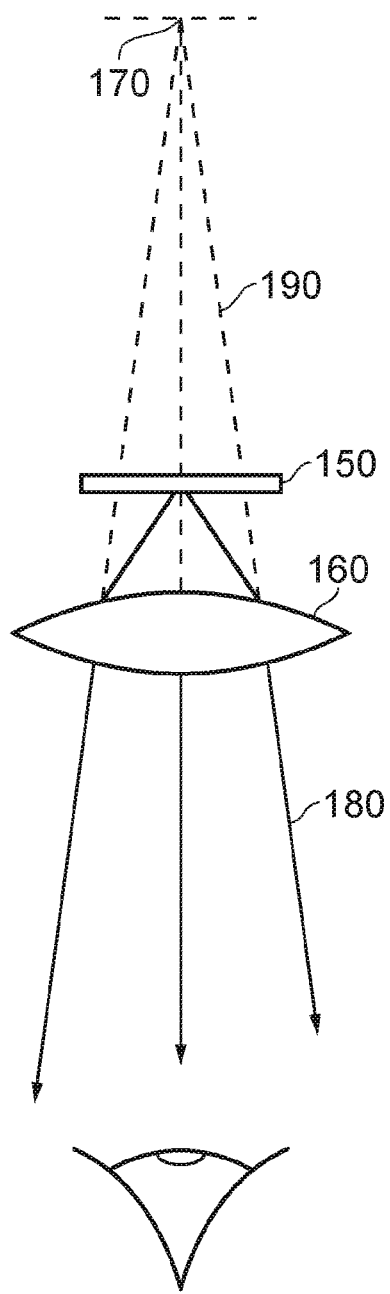
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
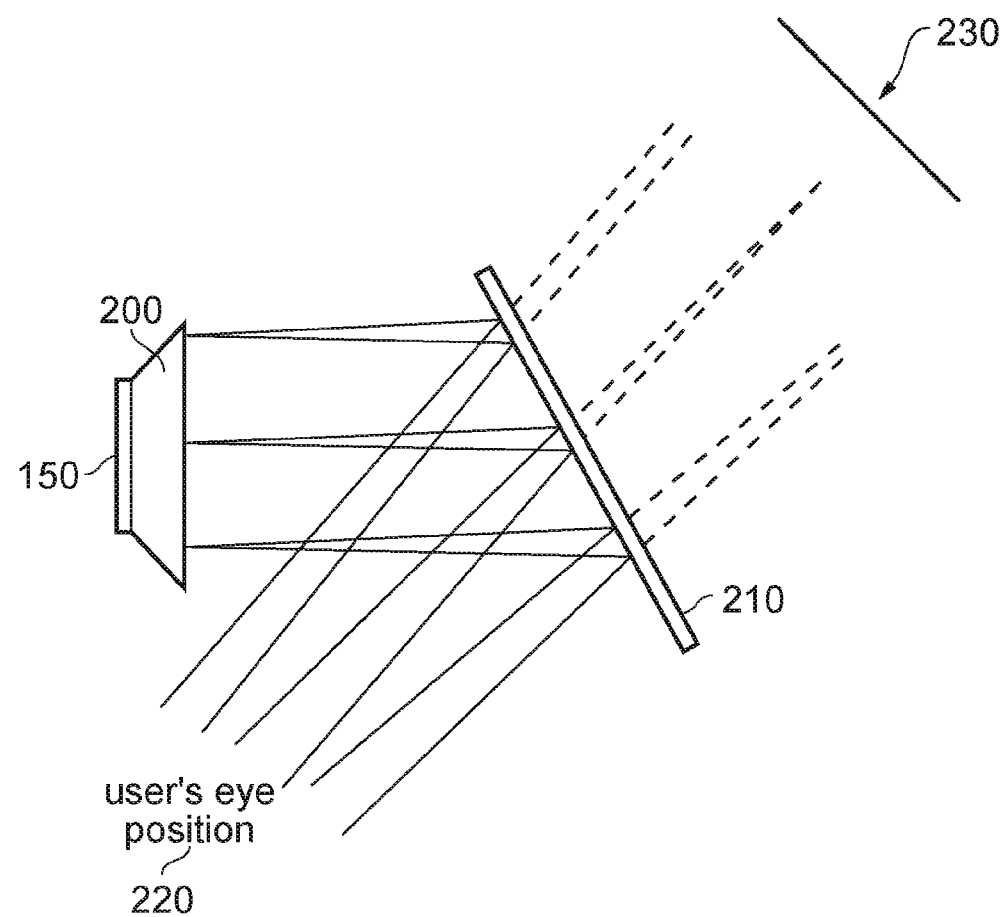
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

Figure 6:
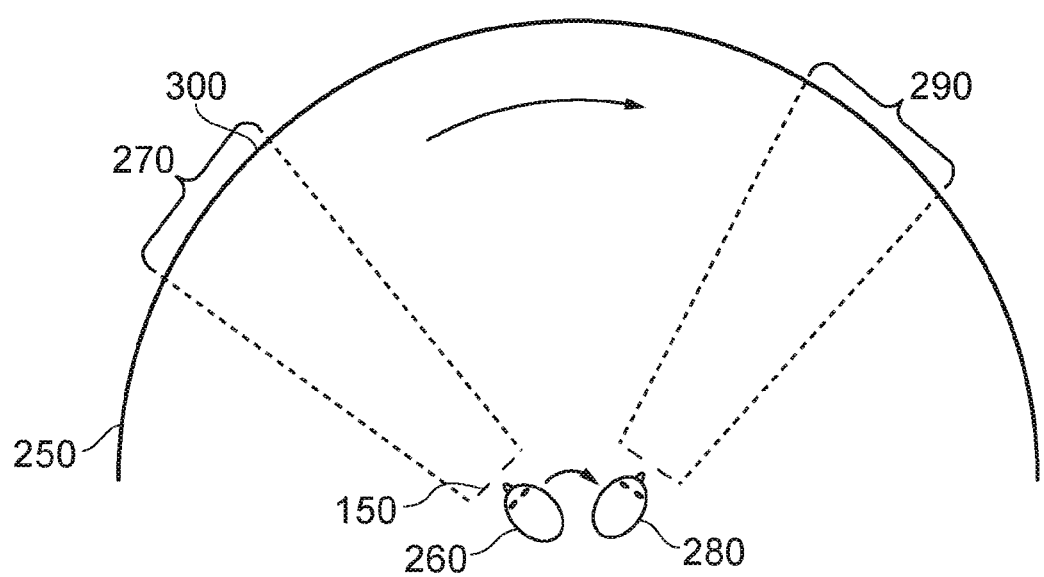
FIG. 6 schematically illustrates a change of view of user of an HMD.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Figure 7:
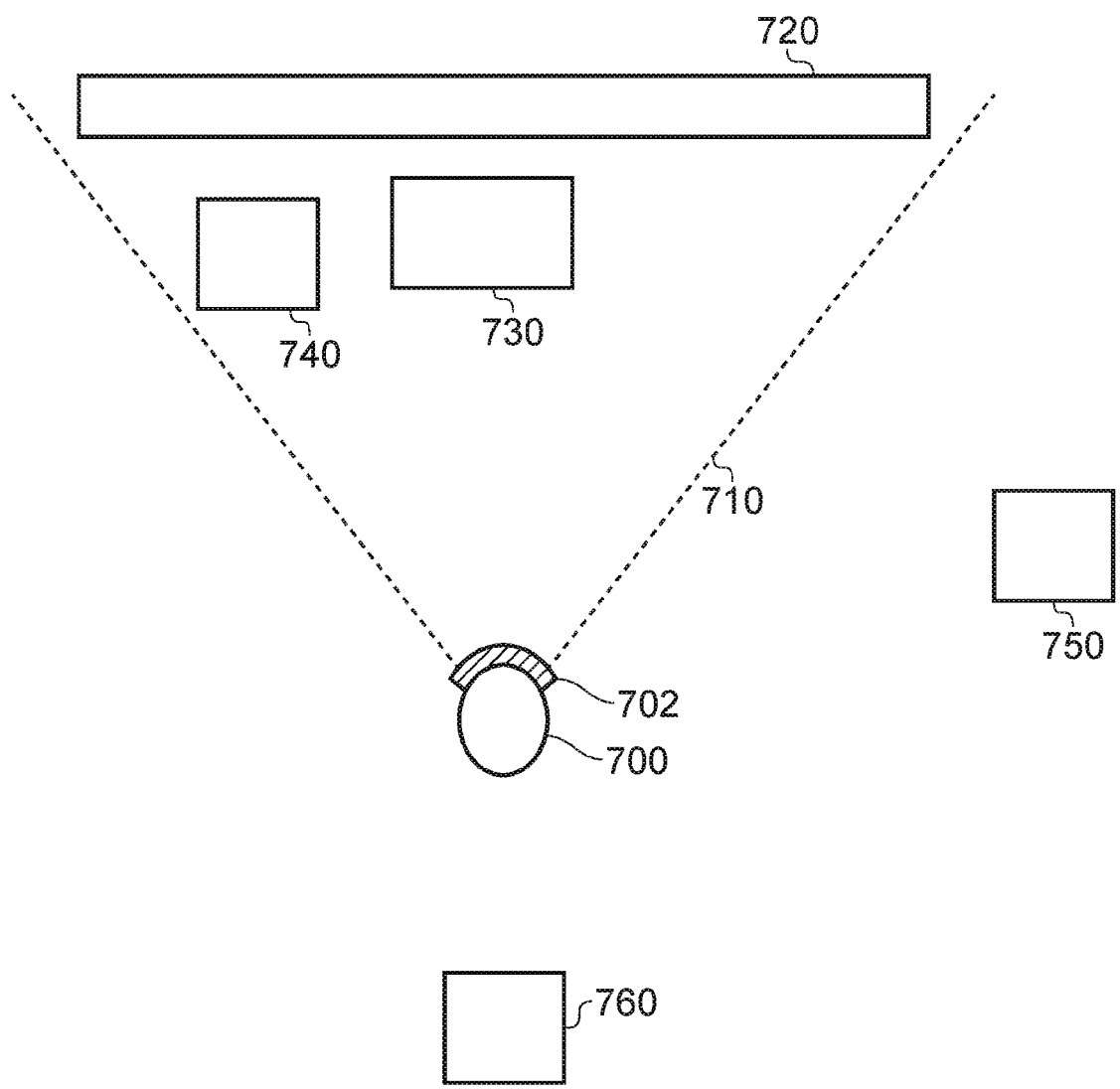
FIG. 7 schematically illustrates an environment comprising a number of sound sources.

FIG. 7 is a schematic illustration of an environment in which several possible sound source locations are in the vicinity of an HMD user. The diagram is a schematic plan view (view from overhead) of the HMD user and the user's immediate surroundings.

In embodiments of the present disclosure the user of the HMD is anticipated to have difficulty in hearing sounds from these sources, either through the use of headphones or because they are hard of hearing. The expectation of a user not being able to hear external sounds may either be a default assumption by the HMD system and therefore processing to assist the user in identifying sound sources may be performed automatically (or perhaps only when headphones are being used with the display). Alternatively, the user may be required to indicate (for example, by a system setting or preference) that they are hard of hearing or are using the HMD system in a manner that would result in external sounds being hard to hear.

The HMD user 700, wearing an HMD 702, has an associated field of view 710. This may be an actual field of view, in the case of an HMD which allows the environment to be viewed by the user (such as a see-through type HMD or an HMD that has a camera that allows the user to be presented with images of the environment captured by the camera), or it may be the expected field of view of the user if were the HMD not being used. However, in examples, this is the field of view of the user created by the display elements within the HMD. So, as the user turns his head, the field of view follows the head movement, which is to say, the field of view is always to the front of the user's head, but the head may be at various orientations with respect to the user's external environment.

A television 720 and an entertainment device 730 associated with the HMD being used are also shown. The television 720 may be used as a secondary display device for the entertainment device 730, used as a separate display device (for example, to provide unrelated content to other people in the room) or indeed may not be used at all. The entertainment device 730 may be used to provide content to the HMD, and its configuration will be described below. In the case of a full immersion HMD in which the user cannot see the external environment, the television is of course not seen by the user. In such an example, the fact that in FIG. 7 the user's field of view appears to encompass the television is therefore coincidental and irrelevant in this particular example, because the user sees what is presented by the display elements of the HMD.

Accordingly, in examples, the user's field of view may be considered as a field of view of a real environment (whether by an optical see-through HMD or an HMD having a camera which provides, to the HMD viewer, images of the real environment) or may be the user's internal HMD view of the display devices of the HMD.

A first example sound source 740 is located within the current field of view of the user 700, and a second example sound source 750 and a third example sound source 760 are located outside of the current field of view of the user 700. Although the sound sources are shown as being present simultaneously in FIG. 7, the example sound sources just indicate example positions of possible sound sources and in a real situation, any number of zero or more sound sources may be present, The example embodiments relate to handling the presence of one or more sound sources.

These sound sources may be any device capable of outputting sound, for example a device such as a radio or a mobile phone, or instead may be another type of item such as a person who is speaking or otherwise making a noise. Any of the devices acting as a sound source may either have their sound output captured by a microphone associated with either of the HMD or entertainment device (or indeed both of these), or may be able to notify the system of their sound output independently of this via a communication with the system. The sound from other items can be captured by a microphone.

Once sound information is received (either via a microphone or a communication, for example via a wireless local area network), processing is performed by the HMD and/or the entertainment device to identify the direction from which the sound originated relative to the position of the user 700. Alternatively, or in addition, the direction may be determined relative to a current orientation of the head-mountable display device.

In the case of a captured sound input, the direction of the sound source may be determined using any of a plurality of arrangements. The HMD may be provided with a directional microphone or a microphone array in order to detect the direction of the sound source independently. Alternatively, or in addition, the entertainment device 730 may be provided with a directional microphone or microphone array, or the HMD and the entertainment device may have microphones which together may form or be part of an array such that each of the HMD and entertainment device has a microphone of the array. Comparing the captured sounds may allow for the detection of a direction of a sound source. The microphone provided to the entertainment device may also be a directional microphone or a microphone array, which may be used in conjunction with the microphone associated with the HMD in order to more precisely determine the direction of the source of a sound.

Alternatively sound information could be provided directly by a device, for example a radio may be able to communicate its sound output and/or location to the entertainment device 730 via a network connection. This communication may comprise volume information, position information of the radio and information about the content being provided by the radio (for example whether it is music, news, weather reports or an emergency announcement). If position information is not provided, it may instead be derived by the entertainment device or the HMD from a map of networked devices stored by the entertainment device, for example. If positional information is not obtained for a sound source of this type, then either the sound output of the device may be used to determine the direction using a microphone or there may be a default image element display used where position information is not available.

The indicated or detected direction can for example be relative to a current orientation of the head-mountable display device. If the detection of direction is by a microphone array or other directional sound detector at the HMD, then the direction of the sound source relative to the HMD can be directly obtained by such a detector. If the detection is at least in part by the entertainment device and/or a microphone array or other detector not forming part of (or not moving with) the HMD, then the HMD or the entertainment device can detect the current relative location and/or orientation of the HMD with respect to the entertainment device, for example by using position and/or orientation detection associated with the HMD, relative to an initial or calibration position and orientation.

Figure 8:
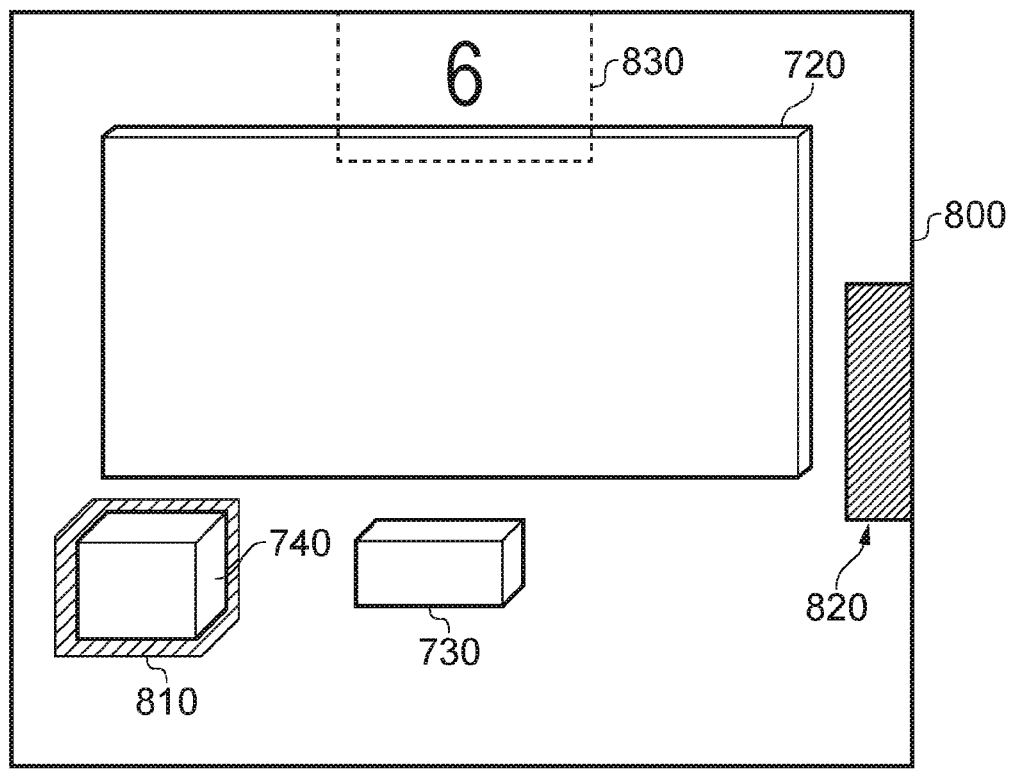
FIG. 8 schematically illustrates a display image of an HMD.

FIG. 8 schematically illustrates a view that may be presented to the HMD user 700 by the HMD display 800. So, the display 800 indicates what the user may see as electronically-provided images when wearing the HMD. The television 720 and entertainment device appear in the image, either because the HMD is a see-through type display or because a camera view of the room is being presented to the user. In other embodiments, as discussed above, this may not be the case and a virtual environment is displayed to the user instead.

The sound source 740 is also visible to the user in the display 800, highlighted by an area 810 surrounding the sound source 740. This is an example of a generated image element highlighting one or more of the outside edges of the source of a sound to identify it in the image displayed to the user.

The highlighting of the object indicates that it is the source of a sound in the environment. In some embodiments, such as in a virtual reality (VR) application, only the highlighting may be presented to the user as the object itself would not be currently displayed. Alternatively, or in addition, the object may be displayed to the user in a virtual reality HMD arrangement as an overlay on the virtual content that is currently being displayed to the user.

Alternatively, an image element such as a simple icon (for example an exclamation mark or other symbol/image that may be used to identify an object) may be displayed to indicate a detected sound or sound source; this may be more suitable for indicating properties of the sound or sound source and/or more aesthetically pleasing to a user than a highlighting as described above. An image element such as this, if located at the position of the sound source on a display, may therefore serve to identify the source of a sound in the displayed image; this is an alternative (or additional) method of identifying a source to highlighting one or more of the outside edges of the object.

Generated image elements may be indicative of the volume of the one or more sounds generated by the one or more sound sources, in addition to or as an alternative to indicating one or more other characteristics of the sound. Alternatively, or in addition, the generated image elements may be indicative of a classification of a type of sound (for example, by type of source or type of sound, such as music or a news alert, and/or by type of sound source such as a human voice, an electronic device or an alarm). Properties of the image element may be varied in order to communicate different characteristics of the sound such as volume or type of sound source. Example properties of the highlighting used to indicate a sound source and its properties as described above include the colour, intensity and size. Example properties of image elements used to indicate a sound source and its properties include colour, intensity, size, shape, animations (such as a flashing effect or motion), and display location.

The image element 820 is positioned so as to indicate the direction of a sound source, rather than directly identifying a specific sound source. This is an example of a scenario in which the direction of a source of the one or more sounds is not within a field of view of the user and as a result an image element is displayed at the edge of the field of view in the corresponding direction.

In this case the image element 820 corresponds to the sound source 750 of FIG. 7. The image element 820 is positioned at the extreme right edge of the display 800 so as to indicate that the sound source 750 is outside of the field of view 710 of the user 700, to the right of the currently displayed area. If the user 700 turns to view the sound source 750, then an image element as described above may be displayed instead to identify a specific object as being the sound source 750 in the new display image. By providing an indication of the direction, a user is intuitively able to turn and look towards the sound source as if they had heard it.

The image element 830 is similar in function to that of the image element 820 in that it indicates that a sound source is present outside of the current field of view, such as the sound source 760 of FIG. 7. The image element 830 is distinguished from the image element 820 in that additional information is provided so as to indicate a direction. In this example, rather than indicating that the sound source is above the user's field of view the '6' is used to indicate that the sound source is directly behind the user (the numeral '6' being chosen in line with the common convention of indicating directions based upon the position of numbers on a clock). Other indications, such as an arrow pointing in the appropriate direction or words describing the sound or sound source may be provided instead, for example.

This is particularly useful when the sound source is directly behind the user, as a left/right indication may be inadequate. In some embodiments image elements in the format of the image element 830 are preferable as they may be sufficient to identify a sound source to a user without the user having to turn and look in that direction; for example, if a user is in an environment with a sound source at the '2' and '4' o'clock position an image element 830 would be more useful for distinguishing them than the image element 820 without the user turning to look towards the sound source.

The image element 830 could instead be used without any indication of direction. The image element 830 could be an example of a default indication that corresponds to a sound with a source that has an undetermined direction relative to the user. Alternatively, the image element 830 could just be indicative of a type of sound that is captured; for example, a doorbell being heard could result in a non-directional display as it would not necessarily be useful to identify the source of the sound if it does not coincide with the location of the door itself.

Therefore, in examples, the one or more generated image elements are indicative of the direction of the source of one or more corresponding sounds. The direction can be relative to a current orientation of the head-mountable display device.

Figure 9:
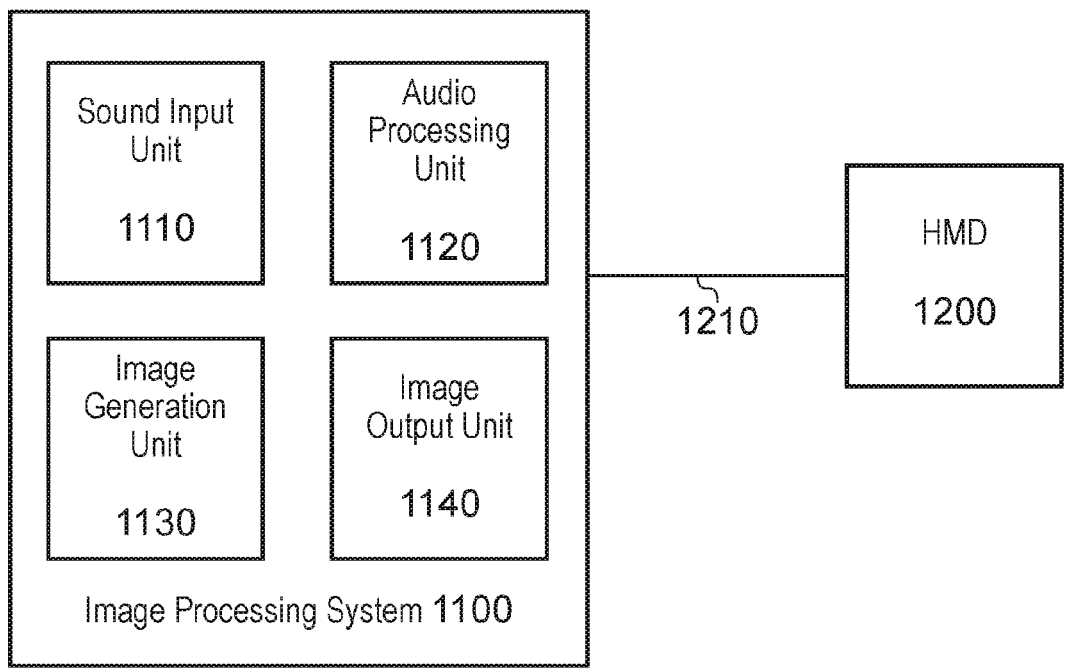
FIG. 9 schematically illustrates a head-mountable display system.

FIG. 9 schematically illustrates a head-mountable display system 1000 comprising an image processing system 1100 and an HMD 1200. The image processing system 1100 may be formed as a part of the HMD 1200, or the HMD 1200 may comprise elements of the image processing system 1100; that is to say that functions of the image processing system may be performed at the HMD 1200 or at a device associated with the HMD 1200.

The image processing system 1100 comprises a sound input unit 1110 (such as a microphone or microphone array, or an input to receive electronic information defining one or more aspects of a sound), an audio processing unit 1120, an image generating unit 1130, and an image output unit 1140.

The sound input unit 1110 is configured to receive sound information relating to one or more sounds. This may be in the form of a sound captured by a microphone (not pictured), as data from a sound source, or a combination of the two.

The audio processing unit 1120 is configured to analyse the sound information relating to the one or more sounds; in other words, the audio processing unit 1120 is configured to analyse the sound information received by the sound input unit 1110. Such an analysis may be performed to determine the direction of the sound source relative to a current orientation of the head-mountable display device, the volume of the sound, or any other property of the sound. Note that a separate dedicated audio processing unit is not required; audio processing can be conducted by a general purpose CPU or graphics processing unit.

The analysis performed may also be able to identify a source, or at least a category of sound source to which the source belongs; for example the analysis could identify whether the sound originates from a radio or a car, or more general categories such as 'electronic device' or 'vehicle'. This information may be derived either from an analysis of the captured sounds, or directly from identifying information in the sound information received directly from the sound source.

The image generating unit 1130 is configured to generate one or more image elements that indicate properties of analysed sound information. The image generating unit 1130 uses the results of the analysis performed by the audio processing unit 1120 in order to determine and/or generate appropriate image elements (and their intended display position, if appropriate) for representing the sound and the direction of the source of the sound.

The image output unit 1140 is configured to output display images for display to a user of a head-mountable display device, the images comprising the generated image elements as an image overlay. The image output unit 1140 is therefore configured to apply an image overlay to an existing video stream for output to the HMD, the image overlay comprising the image elements generated by the image generating unit 1130.

The HMD 1200 is a display device operable to display primary images in addition to overlay images generated by the image processing system 1100, for example the HMD 20 illustrated in FIG. 1. The images for display generated by the image processing system 1100 may be transmitted to the HMD via any appropriate wired or wireless connection, such as the connection 1210.

Figure 10:
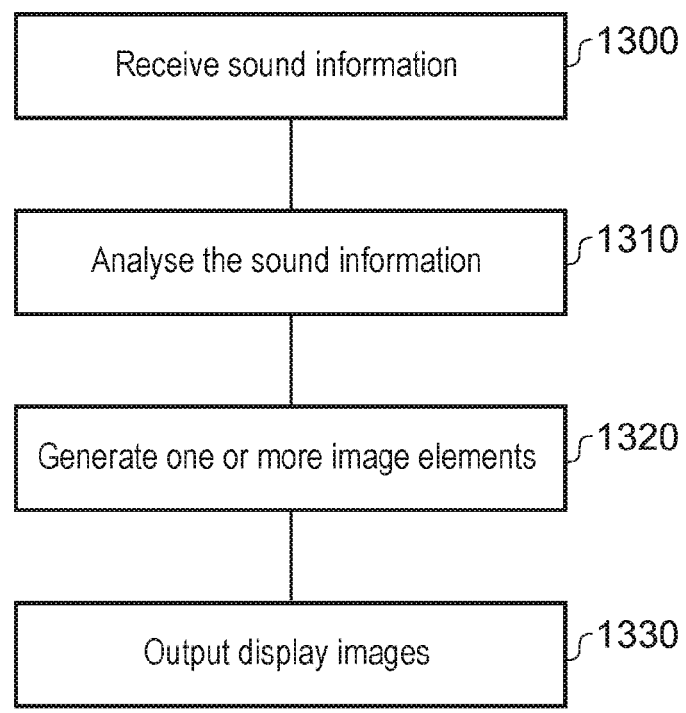
FIG. 10 schematically illustrates an image processing method.

FIG. 10 schematically illustrates a method of generating image elements indicating properties of sounds in the environment.

A step 1300 comprises receiving sound information. This sound information may relate to one or more sounds. In an example application, this step could be the capturing of the sound of someone speaking in the environment using a microphone.

A step 1310 comprises analysing the sound information relating to the received sound information. In the context of the example application, this may comprise determining that the captured sound is speech, the volume, whether the HMD user's name was said (to infer whether the speech is directed towards the user; alternatively a camera associated with the system could capture an image of the speaker to determine whether they are looking at the HMD user as this may be an indicator of who the speaker is directing their speech towards), or any other characteristic of the speech in addition to a detection of the direction of the speaker (i.e. sound source) relative to the orientation of the HMD.

A step 1320 comprises generating one or more image elements. These image elements may indicate properties of the analysed sound information. In the example application, an image element may be generated that denotes that the detected sound is speech (such as an icon depicting a mouth). The colour of the icon could indicate a gender of the speaker (based on pitch detection, or image recognition if the speaker is visible in an image obtained by the processing device), and the size could indicate a volume. The position of the icon may be freely determined based on the direction of the sound source relative to the HMD user as discussed with reference to FIG. 8.

A step 1330 comprises outputting display images. These may be images for display to a user of a head-mountable display device, with the images comprising the generated image elements as an image overlay. In the example application, the step 1330 comprises displaying the image element over the primary stream that the user is viewing as an image overlay.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. An image processing system for generating an image for display to a user at a head-mountable display device, the system comprising:
   a sound input unit configured to receive sound information relating to one or more sounds from a device, which is located in proximity to the user, where:
   (i) at least a first portion of the sound information is received over a communications network,
   (ii) at least a second portion of the sound information, containing different sound data from the first portion, emanates from the device and is captured by a microphone located proximate to the head-mountable display, and
   (iii) the sound information from the device, comprising two different portions of the sound information, is received at the head-mountable display device via two different methods;
   an audio processing unit configured to analyse the sound information relating to the one or more sounds;
   an image generation unit configured to generate one or more image elements that indicate properties of the analysed sound information; and
   an image output unit configured to output display images for display to a user of the head-mountable display device, the images comprising the one or more generated image elements as an image overlay,
   wherein the one or more generated image elements are indicative of a direction from which the one or more sounds emanate from the device,
   wherein the sound information includes data indicative of a sound output of the device, and wherein the image generation unit generates the one or more generated image elements in response to the data indicative of the sound output from the device.

2. The image processing system according to claim 1, wherein the direction is relative to a current orientation of the head-mountable display device.

3. The image processing system according to claim 1, wherein the one or more generated image elements are indicative of a volume of the one or more sounds.

4. The image processing system according to claim 1, wherein the one or more generated image elements are indicative of a classification of a type of the one or more sounds.

5. The image processing system according to claim 1, wherein the one or more generated image elements are generated with one or more of a particular colour, display location, intensity, shape, or size o to indicate a property of the one or more sounds.

6. The image processing system according to claim 1, wherein if the direction from which the one or more sounds emanate is not within a field of view of the user, the one or more generated image elements includes an image element that is displayed at an edge of the field of view in a corresponding direction.

7. The image processing system according to claim 1, wherein the one or more generated image elements identify a source of the one or more sounds.

8. The image processing system according to claim 7, wherein the one or more generated image elements highlight one or more outside edges of an object indicating the source of the one or more sounds to identify it in the image displayed to the user.

9. The image processing system according to claim 1, wherein the received sound information also comprises position information of the device.

10. The image processing system according to claim 1, further comprising: the head-mountable display device.

11. An image processing method for generating an image for display to a user at a head-mountable display device, the method comprising:
  receiving sound information relating to one or more sounds from a device, which is located in proximity to the user, where:
  (i) at least a first portion of the sound information is received over a communications network,
  (ii) at least a second portion of the sound information, containing different sound data from the first portion, emanates from the device and is captured by a microphone located proximate to the head-mountable display, and
  (iii) the sound information from the device, comprising two different portions of the sound information, is received at the head-mountable display device via two different methods;
  analysing the sound information relating to the one or more sounds;
  generating one or more image elements that indicate properties of the analysed sound information; and
  outputting display images for display to a user of the head-mountable display device, the images comprising the one or more generated image elements as an image overlay,
  wherein the one or more generated image elements are indicative of a direction from which the one or more sounds emanate from the device,
  wherein the sound information includes data indicative of a sound output of the device, and
  wherein the generating includes generating the one or more generated image elements in response to the data indicative of the sound output from the device.

12. A non-transitory machine-readable storage medium which stores computer software, which when executed by a computer, causes the computer to generate an image for display to a user at a head-mountable display device, by carrying out actions, comprising:
  receiving sound information relating to one or more sounds from a device, which is located in proximity to the user, where:
  (i) at least a first portion of the sound information is received over a communications network,
  (ii) at least a second portion of the sound information, containing different sound data from the first portion, emanates from the device and is captured by a microphone located proximate to the head-mountable display, and
  (iii) the sound information from the device, comprising two different portions of the sound information, is received at the head-mountable display device via two different methods;
  analysing the sound information relating to the one or more sounds;
  generating one or more image elements that indicate properties of the analysed sound information; and
  outputting display images for display to a user of the head-mountable display device, the images comprising the one or more generated image elements as an image overlay,
  wherein the one or more generated image elements are indicative of a direction from which the one or more sounds emanate from the device,
  wherein the sound information includes data indicative of a sound output of the device, and
  wherein the generating includes generating the one or more generated image elements in response to the data indicative of the sound output from the device.

* * * * *